(12) United States Patent
New

(10) Patent No.: US 12,127,316 B2
(45) Date of Patent: Oct. 22, 2024

(54) CURRENT DRIVING CIRCUIT PROVIDING NONLINEAR DRIVING CURRENT TO COMPENSATE FOR LIGHT-EMITTING DEVICE

(71) Applicant: Lite-On Singapore Pte Ltd, Singapore (SG)

(72) Inventor: Lee Fu New, Singapore (SG)

(73) Assignee: Lite-On Singapore Pte Ltd, Singapore (SG)

( * ) Notice: Subject to any disclaimer, the term of this patent is extended or adjusted under 35 U.S.C. 154(b) by 79 days.

(21) Appl. No.: 17/827,810

(22) Filed: May 30, 2022

(65) Prior Publication Data

US 2023/0217569 A1 Jul. 6, 2023

(30) Foreign Application Priority Data

Jan. 4, 2022 (TW) .................................. 111100191

(51) Int. Cl.
*H05B 47/105* (2020.01)

(52) U.S. Cl.
CPC .................................. *H05B 47/105* (2020.01)

(58) Field of Classification Search
CPC .... H05B 47/105; H05B 45/397; H05B 45/18; Y02B 20/30
See application file for complete search history.

(56) References Cited

U.S. PATENT DOCUMENTS

| 4,404,462 A | * | 9/1983 | Murray | C02F 1/5209 219/501 |
| 6,265,857 B1 | * | 7/2001 | Demsky | G05F 3/245 323/907 |
| 7,110,729 B1 | * | 9/2006 | Dash | G05F 3/262 455/298 |

(Continued)

FOREIGN PATENT DOCUMENTS

| CN | 203632907 | 6/2014 |
| TW | 200947182 | 11/2009 |

(Continued)

OTHER PUBLICATIONS

"Office Action of Taiwan Counterpart Application", issued on Dec. 7, 2022, p. 1-p. 8.

*Primary Examiner* — Raymond R Chai
(74) *Attorney, Agent, or Firm* — JCIPRNET

(57) ABSTRACT

A current driving circuit configured to drive a light-emitting device is provided. The current driving circuit includes a first current generating circuit, a second current generating circuit and a driver circuit. The first current generating circuit is configured to generate a reference current. The second current generating circuit includes at least one variable resistor, and may generate a compensation current according to the at least one variable resistor. The at least one variable resistor is selected from at least one of a positive TCR resistor and a negative TCR resistor. The driver circuit is coupled to the first current generating circuit and the second current generating circuit, and configured to (Continued)

receive the reference current and the compensation current to serve as a driving current. The driver circuit outputs the driving current to drive the light-emitting device.

22 Claims, 9 Drawing Sheets

(56) References Cited

U.S. PATENT DOCUMENTS

| | | | |
|---|---|---|---|
| 7,595,685 B1* | 9/2009 | Sakurai | G05F 3/262 |
| | | | 327/513 |
| 7,888,987 B2* | 2/2011 | Horie | H03F 1/301 |
| | | | 327/543 |
| 8,760,143 B2* | 6/2014 | Satoh | G05F 3/30 |
| | | | 323/907 |
| 9,466,986 B2* | 10/2016 | Kwon | H02J 4/00 |
| 9,585,208 B2* | 2/2017 | Wan | H05B 45/18 |
| 2009/0140792 A1* | 6/2009 | Horie | H03F 1/302 |
| | | | 327/513 |
| 2011/0291578 A1 | 12/2011 | Philippbar et al. | |
| 2012/0212284 A1* | 8/2012 | Horie | H03F 3/195 |
| | | | 327/513 |
| 2013/0154489 A1* | 6/2013 | Chang | H05B 45/28 |
| | | | 315/192 |
| 2014/0152106 A1* | 6/2014 | Kwon | H02J 4/00 |
| | | | 307/52 |
| 2016/0187912 A1* | 6/2016 | Lee | G05F 3/08 |
| | | | 323/313 |
| 2016/0249419 A1* | 8/2016 | Wan | H05B 45/3725 |
| 2018/0081384 A1* | 3/2018 | Sandhu | G05F 3/08 |
| 2019/0277705 A1* | 9/2019 | Lee | G01K 7/21 |
| 2020/0301457 A1 | 9/2020 | Ilardo | |
| 2022/0418062 A1* | 12/2022 | Chen | H05B 45/14 |
| 2023/0006656 A1* | 1/2023 | Akahane | H03K 17/60 |
| 2023/0152836 A1* | 5/2023 | Englekirk | H03M 1/66 |
| | | | 323/313 |
| 2024/0015866 A1* | 1/2024 | Nakayama | H05B 45/325 |
| 2024/0023278 A1* | 1/2024 | Stefanoski | H05K 7/20281 |

FOREIGN PATENT DOCUMENTS

| | | |
|---|---|---|
| TW | 201421899 | 6/2014 |
| TW | 202127173 | 7/2021 |

* cited by examiner

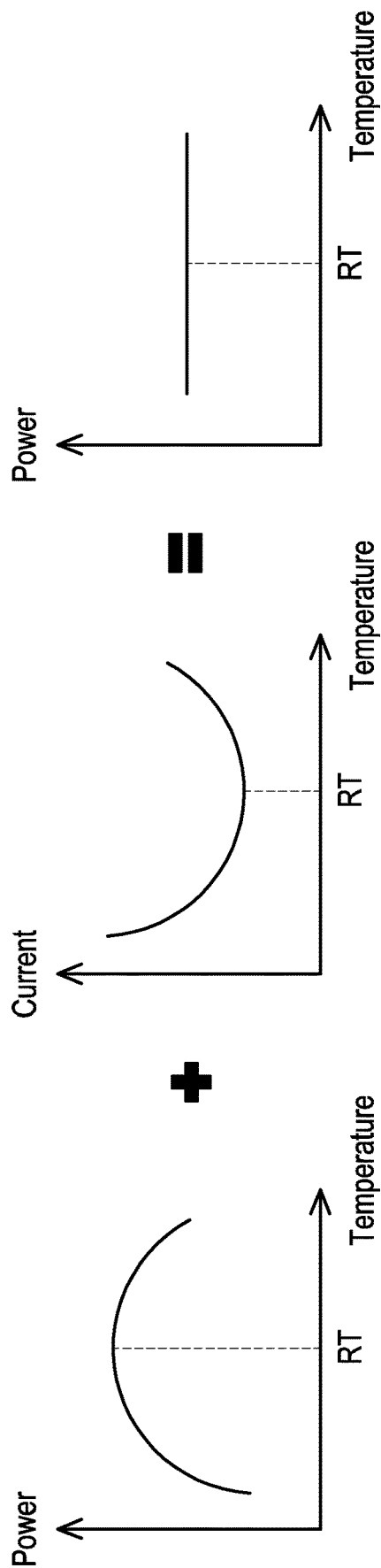

CURRENT DRIVING CIRCUIT PROVIDING NONLINEAR DRIVING CURRENT TO COMPENSATE FOR LIGHT-EMITTING DEVICE

CROSS-REFERENCE TO RELATED APPLICATION

This application claims the priority benefit of Taiwan application serial no. 111100191, filed on Jan. 4, 2022. The entirety of the above-mentioned patent application is hereby incorporated by reference herein and made a part of this specification.

BACKGROUND

Technical Field

The disclosure relates to a driving circuit, and in particular relates to a current driving circuit.

Description of Related Art

Proximity sensors are widely configured in mobile devices such as mobile phones and wireless headsets. Proximity sensors have built-in light-emitting devices and photoelectric sensors. A light-emitting device emits a specific light beam (such as an infrared ray), which is reflected by an object as a reflected light beam. After the photoelectric sensor senses the reflected light, the proximity sensor may determine whether the mobile device is close to or far from the object based on an intensity value of the reflected light. Thus, the proximity sensor may be applied to measure the distance from an object to the screen during a phone call to turn on or off the screen of the mobile phone. Alternatively, the proximity sensor may also be applied in a similar way in True Wireless Stereo (TWS) applications to pause or play music when the user removes or puts on the headset.

However, when the temperature changes, the emissive power of a light-emitting device also changes, and the change has a nonlinear characteristic. This nonlinearity may lead to inaccurate distance measurements from the optical system (e.g., the proximity sensor). As a result, a phone screen may be turned on during a call; or, in TWS applications, the music may not be paused when the user removes the headset from the ear.

SUMMARY

The disclosure provides a current driving circuit, which provides a nonlinear driving current to compensate for a light-emitting device, in which the output power varies nonlinearly as the temperature changes.

A current driving circuit according to an aspect of the disclosure is suitable for driving a light-emitting device. The current driving circuit includes a first current generating circuit, a second current generating circuit, and a driver circuit. The first current generating circuit is configured to generate a reference current. The second current generating circuit includes at least one variable resistor. The second current generating circuit generates a compensation current according to the at least one variable resistor. The at least one variable resistor is selected from at least one of a positive temperature variable resistor and a negative temperature variable resistor. The driver circuit is coupled to the first current generating circuit and the second current generating circuit. The driver circuit is configured to receive the reference current and the compensation current as a driving current. The driver circuit outputs the driving current to drive the light-emitting device.

In an embodiment of the disclosure, the at least one variable resistor includes the positive temperature variable resistor. The second current generating circuit includes a first current source circuit. The first current source circuit includes the positive temperature variable resistor. The first current source circuit generates a positive temperature coefficient current according to the positive temperature variable resistor. The first current source circuit outputs the positive temperature coefficient current as the compensation current in a first temperature interval between a first temperature and a second temperature. A sum of the positive temperature coefficient current and the reference current is configured as the driving current to drive the light-emitting device. The first temperature is higher than the second temperature, and the second temperature is a first critical temperature.

In an embodiment of the disclosure, the first current source circuit further includes a first bias current source, a first current source, and a first switching element. The first bias current source has a first end and a second end. The first end of the first bias current source is coupled to the first voltage. The first current source has a first end and a second end. The first end of the first current source is coupled to a first voltage. The first switching element has a first end, a second end, and a control end. The first end of the first switching element is coupled to the second end of the first current source. The second end of the first switching element is coupled to the driver circuit. The control end of the first switching element is coupled to the second end of the first bias current source. The positive temperature coefficient current is output from the second end of the first switching element. The positive temperature variable resistor has a first end and a second end. The first end of the positive temperature variable resistor is coupled to the second end of the first bias current source. The second end of the positive temperature variable resistor is coupled to a second voltage.

In an embodiment of the disclosure, the at least one variable resistor includes the negative temperature variable resistor. The second current generating circuit includes a second current source circuit. The second current source circuit includes the negative temperature variable resistor. The second current source circuit generates a negative temperature coefficient current according to the negative temperature variable resistor. The second current source circuit outputs the negative temperature coefficient current as the compensation current in a second temperature interval between a third temperature and a fourth temperature. The sum of the negative temperature coefficient current and the reference current is configured as the driving current to drive the light-emitting device. The third temperature is a second critical temperature, and the third temperature is higher than the fourth temperature.

In an embodiment of the disclosure, the second current source circuit further includes a second bias current source, a second current source, and a second switching element. The second bias current source has a first end and a second end. The first end of the second bias current source is coupled to the first voltage. The second current source has a first end and a second end. The first end of the second current source is coupled to the first voltage. The second switching element has a first end, a second end, and a control end. The first end of the second switching element is coupled to the second end of the second current source. The second end of the second switching element is coupled to the driver circuit. The control end of the second switching element is coupled to the second end of the second bias current source. A negative temperature coefficient current is output from the second end of the second switching element. The negative temperature variable resistor has a first end and a second end. The first end of the negative temperature variable resistor is coupled to the second end of the second bias current source. The second end of the negative temperature variable resistor is coupled to the second voltage.

In an embodiment of the disclosure, in a third temperature interval between the second temperature and the third temperature, the first current source circuit outputs the reference current, and the second current source circuit does not output the positive temperature coefficient current and the negative temperature coefficient current. The driver circuit receives the reference current as a driving current to drive the light-emitting device.

In an embodiment of the disclosure, the current driving circuit further includes a first control circuit. The first control circuit is coupled to the first current source circuit and the second current source circuit. The first control circuit is configured to regulate current slopes of the positive temperature coefficient current and the negative temperature coefficient current.

In an embodiment of the disclosure, the current driving circuit further includes a switching circuit. The switching circuit is coupled to the first current source circuit and the second current source circuit. The switching circuit is configured to control whether the first current source circuit and the second current source circuit output the compensation current. The current driving circuit further includes a second control circuit. The second control circuit is coupled to the switching circuit. The second control circuit is configured to control a conduction state of the switching circuit.

In an embodiment of the disclosure, the current driving circuit further includes a third control circuit. The third control circuit is coupled to the positive temperature variable resistor and the negative temperature variable resistor. The third control circuit is configured to regulate a temperature interval in which the second current generating circuit outputs the compensation current.

In an embodiment of the disclosure, the current driving circuit further includes at least one current mirror circuit. The at least one current mirror circuit is coupled to the at least one variable resistor. The at least one current mirror circuit is configured to control whether the second current generating circuit outputs the compensation current according to a cross voltage of the at least one variable resistor in different temperature intervals.

In an embodiment of the disclosure, the at least one variable resistor includes the positive temperature variable resistor and the negative temperature variable resistor. The second current generating circuit includes a first current source circuit and a second current source circuit. The second current source circuit includes the negative temperature variable resistor. The second current source circuit generates a positive temperature coefficient current according to the negative temperature variable resistor. The second current source circuit outputs the positive temperature coefficient current as the compensation current in a first temperature interval between a first temperature and a second temperature. A sum of the positive temperature coefficient current and the reference current is configured as the driving current to drive the light-emitting device. The first temperature is higher than the second temperature, and the second temperature is a first critical temperature. The first current source circuit includes a positive temperature variable resistor. The first current source circuit generates a negative temperature coefficient current according to the positive temperature variable resistor. The first current source circuit outputs the negative temperature coefficient current as the compensation current in a second temperature interval between a third temperature and a fourth temperature. A sum of the negative temperature coefficient current and the reference current is configured as the driving current to drive the light-emitting device. The third temperature is a second critical temperature, in which the second critical temperature is lower than the first critical temperature, and the third temperature is higher than the fourth temperature.

A current driving circuit according to another aspect of the disclosure is configured in an optoelectronic device to adjust a modulation current of the light-emitting device as the temperature changes. The current driving circuit includes a current modulation circuit and a driver circuit. The current modulation circuit is configured to generate a reference current and a compensation current. The current modulation circuit includes at least one variable resistor, and the current modulation circuit generates the compensation current according to the at least one variable resistor, so that the current modulation circuit is configured to modulate and output the compensation current in different temperature intervals. The driver circuit is coupled to the current modulation circuit, which is configured to receive the reference current and the compensation current. A sum of the reference current and the compensation current is configured as a driving current. The driver circuit outputs the driving current to drive the light-emitting device.

In an embodiment of the disclosure, the at least one variable resistor is selected from at least one of a positive temperature variable resistor and a negative temperature variable resistor.

In an embodiment of the disclosure, the current modulation circuit further includes a first current generating circuit and a second current generating circuit. The first current generating circuit is configured to generate the reference current. The second current generating circuit includes the at least one variable resistor. The second current generating circuit generates the compensation current according to the at least one variable resistor.

Based on the above, in the embodiments of the disclosure, since the second current generating circuit is capable of generating the compensation current according to the at least one variable resistor, the current driving circuit is capable of providing a nonlinear driving current to compensate for the light-emitting device whose output power varies nonlinearly as the temperature changes. That is, the driving current may be adjusted instantaneously and continuously with different operating temperatures. Accordingly, the power the light-emitting device of the optical measurement system remains stable throughout the entire temperature range, and a distance measurement can be carried out accurately.

In order to make the aforementioned features and advantages of the disclosure comprehensible, embodiments accompanied with drawings are described in detail below.

BRIEF DESCRIPTION OF THE DRAWING

FIG. 2A is a schematic diagram illustrating a nonlinear variation of the output power of an uncompensated light-emitting device VCSEL as the temperature changes according to an embodiment of the disclosure.

FIG. 2B is a schematic diagram illustrating a nonlinear variation of a driving current as the temperature changes according to an embodiment of the disclosure.

FIG. 2C is a schematic diagram illustrating a linear variation of the output power of a compensated light-emitting device VCSEL as the temperature changes according to an embodiment of the disclosure.

DETAILED DESCRIPTION OF DISCLOSED EMBODIMENTS

Figure 1A:
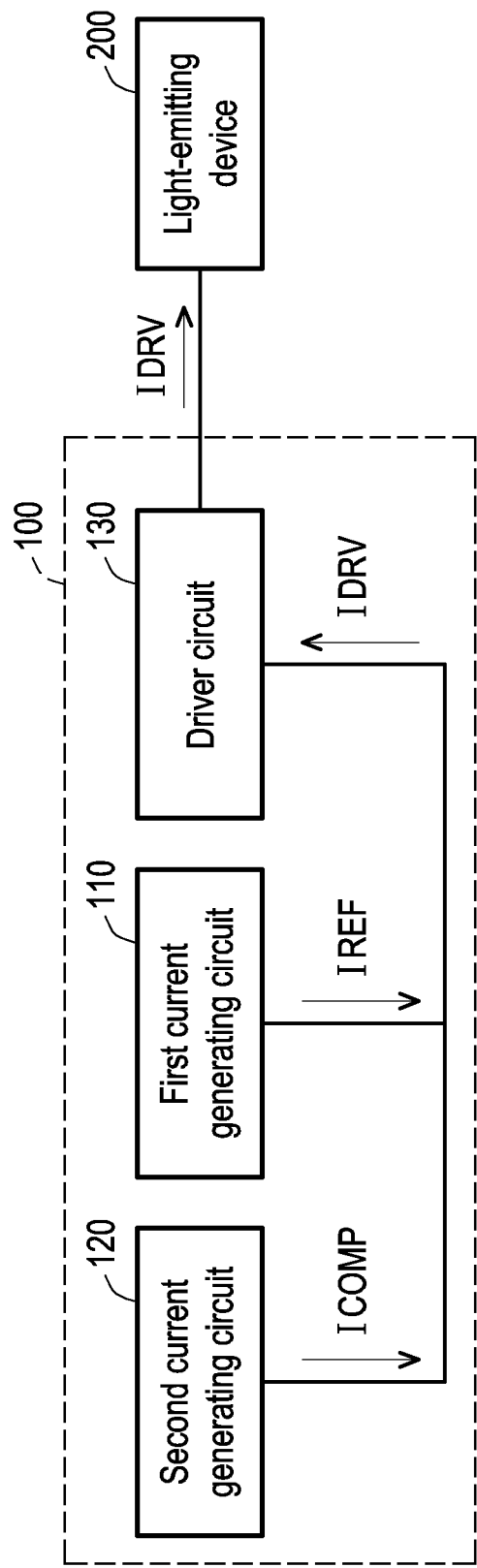
FIG. 1A is a schematic block diagram illustrating a current driving circuit suitable for driving a light-emitting device according to an embodiment of the disclosure.

FIG. 1A is a schematic block diagram illustrating a current driving circuit suitable for driving a light-emitting device according to an embodiment of the disclosure. Referring to FIG. 1A, a current driving circuit 100 outputs a driving current IDRV to drive the light-emitting device 200. The light-emitting device 200 may be a laser, for example, a vertical-cavity surface-emitting laser (VCSEL), but the disclosure is not limited thereto. The current driving circuit 100 of this embodiment is suitable for driving an optoelectronic device such as a light-emitting device of a proximity sensor, but is not limited thereto.

The current driving circuit 100 includes a first current generating circuit 110, a second current generating circuit 120, and a driver circuit 130. The first current generating circuit 110 is configured to generate a reference current IREF (e.g., an initial predetermined current value of the light-emitting device), and the reference current IREF is configured as a current that is not related to the temperature. The second current generating circuit 120 includes at least one variable resistor (resistors R1 and/or R2 in FIG. 4). The second current generating circuit 120 generates a compensation current ICOMP according to the at least one variable resistor. The at least one variable resistor is at least one selected from a positive temperature coefficient of resistance (TCR) resistor R1 and a negative TCR resistor R2. The driver circuit 130 is coupled to the first current generating circuit 110 and the second current generating circuit 120. The driver circuit 130 is configured to receive the reference current IREF and the compensation current ICOMP, and the sum of the reference current IREF and the compensation current ICOMP is configured as the driving current IDRV (also referred to as the modulation current). The driver circuit 130 outputs the driving current IDRV to drive the light-emitting device 200 and modulate the intensity of the output light from the light-emitting device 200.

Generally speaking, the output power of a VCSEL varies nonlinearly as the temperature changes. In other words, during a laser excitation operation of a VCSEL, the threshold current of the VCSEL varies as the operating temperature changes. To provide stable and accurate optical measurements, the optical properties of an optical measurement system including the VCSEL needs to be independent of and unaffected by temperature changes. The current driving circuit 100 of the embodiment can compensate for the characteristic that the output power of the VCSEL varies nonlinearly as the temperature changes. Therefore, the optical measurement system with the current driving circuit 100 can provide stable and accurate optical measurements. For example, a VCSEL is adopted as a light-emitting device for measurement in the light-emitting device of a proximity sensor in a mobile phone, and the VCSEL of the proximity sensor is driven by the modulation current provided by the current driving circuit 100. In this way, the proximity sensor is capable of providing stable and accurate optical measurements within a wide operating temperature range.

Figure 1B:
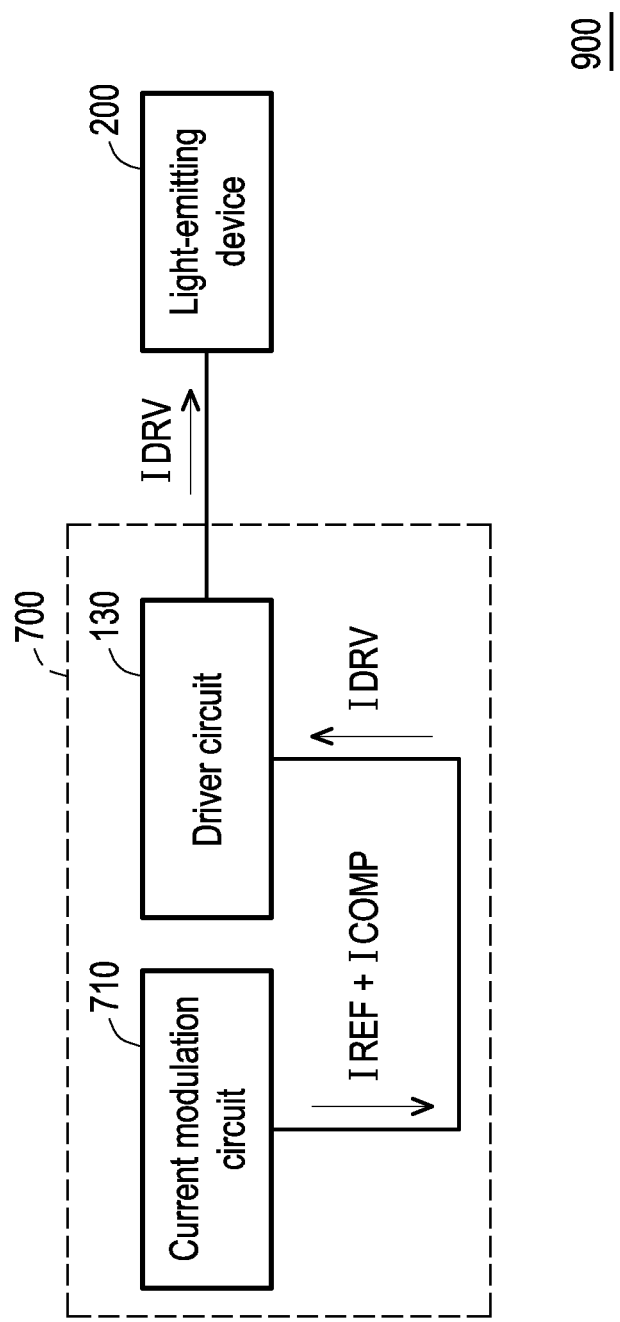
FIG. 1B is a schematic block diagram illustrating a current driving circuit suitable for driving a light-emitting device according to another embodiment of the disclosure.

FIG. 1B is a schematic block diagram illustrating a current driving circuit suitable for driving a light-emitting device according to another embodiment of the disclosure. Referring to FIG. 1B, a current driving circuit 700 is, for example, configured in an optoelectronic device 900 to adjust a modulation current of the light-emitting device 200 as the temperature changes. The optoelectronic device 900 may be, for example, a mobile phone or a wireless headset including a proximity sensor, but the disclosure is not limited thereto.

Specifically, the current driving circuit 700 includes a current modulation circuit 710 and a driver circuit 130. The current modulation circuit 710 is configured to generate the reference current IREF and the compensation current ICOMP. The current modulation circuit 710 includes at least one variable resistor. The current modulation circuit 710 generates the compensation current ICOMP according to the at least one variable resistor. The current modulation circuit 710 is configured to modulate and output the compensation current ICOMP in different temperature intervals.

The driver circuit 130 is coupled to the current modulation circuit 710. The driver circuit 130 is configured to receive the reference current IREF and the compensation current ICOMP. The sum of the reference current IREF and the compensation current ICOMP is configured as the driving current IDRV (also called the modulation current). The driver circuit 130 outputs the driving current IDRV to drive the light-emitting device 200 and modulate the intensity of the output light from the light-emitting device 200.

FIG. 2A is a schematic diagram illustrating a nonlinear variation of the output power of an uncompensated light-emitting device VCSEL as the temperature changes according to an embodiment of the disclosure. FIG. 2B is a schematic diagram illustrating a nonlinear variation of a driving current as the temperature changes according to an embodiment of the disclosure. FIG. 2C is a schematic diagram illustrating a linear variation of the output power of a compensated light-emitting device VCSEL as the temperature changes according to an embodiment of the disclosure.

Referring to FIG. 2A to FIG. 2C, FIG. 2A discloses the nonlinear characteristics of the output power of the light-emitting device VCSEL throughout the entire wide temperature range. Compared to a room temperature RT, the output power of VCSEL changes at a low temperature and a high temperature. In this example, a decreasing trend is shown, but the disclosure is not limited thereto. In order to compensate for the nonlinear characteristic of the output power of the light-emitting device VCSEL, the current driving circuit 100 may provide a nonlinear driving current as shown in FIG. 2B. The characteristic of the nonlinear driving current that varies as the temperature changes is opposite to the direction of the output power of the light-emitting device VCSEL, that is, the relationship is substantially an inversely proportional relationship. Therefore, the output power of the light-emitting device VCSEL, after compensation, may vary linearly with temperature. The slope is not particularly limited, and the slope may be equal or not equal to zero, as shown in FIG. 2C.

Figure 3:
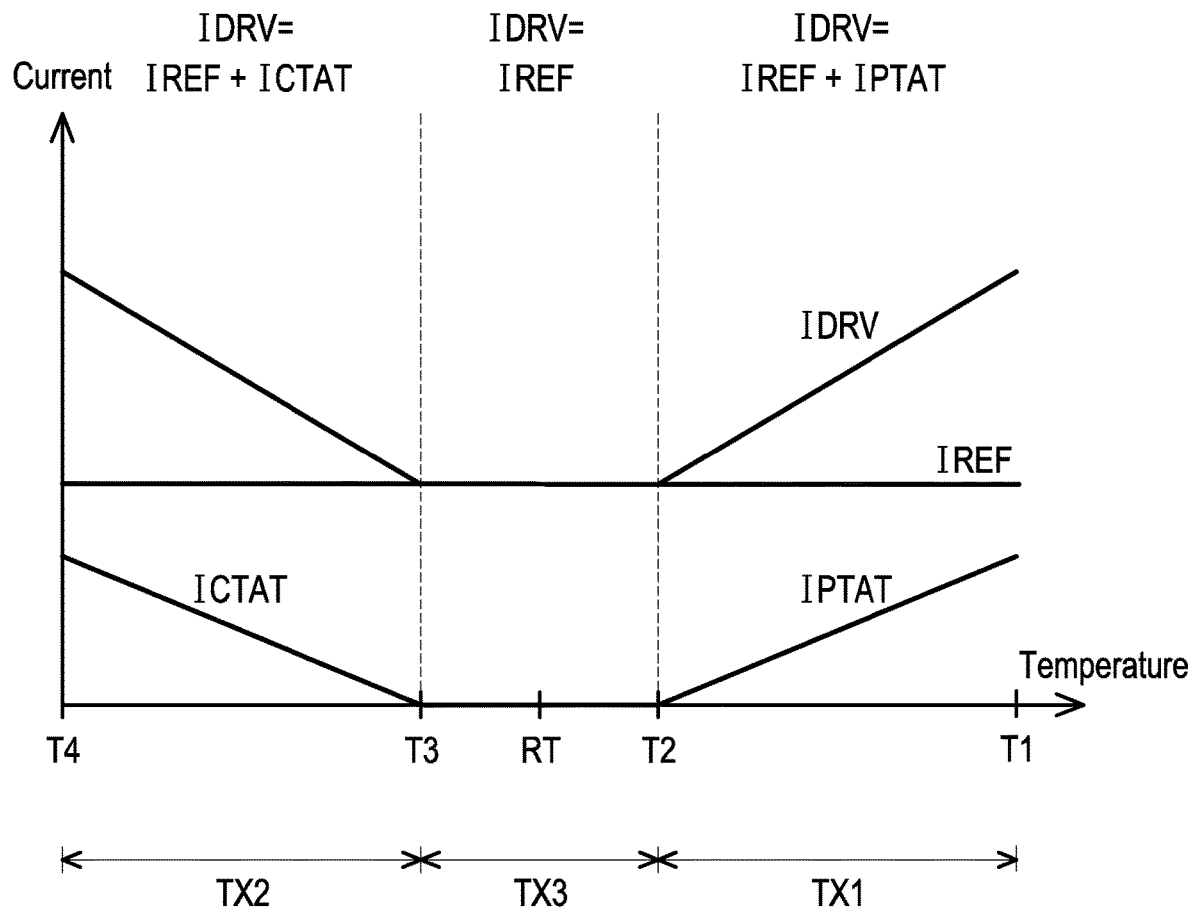
FIG. 3 is a schematic diagram illustrating a nonlinear variation of a driving current as the temperature changes according to another embodiment of the disclosure.

FIG. 3 is a schematic diagram illustrating a nonlinear variation of a driving current as the temperature changes according to another embodiment of the disclosure. Referring to FIG. 3, the compensation current ICOMP includes two different types of currents, one is a negative temperature coefficient current (also known as a complementary to absolute temperature current, ICTAT), and the other is a positive temperature coefficient current (also known as proportional to absolute temperature current, IPTAT), to generate a temperature distribution of the driving current IDRV as shown in FIG. 3 and thereby compensate for the variation of the output power of the light-emitting device VCSEL as the temperature changes. Both the negative temperature coefficient current (ICTAT) and the positive temperature coefficient current (IPTAT) are temperature-dependent currents. The current source of the IPTAT and the current source of the ICTAT may be turned on in different temperature ranges to output the IPTAT and ICTAT currents, and the IPTAT and ICTAT currents are added to the reference current IREF to generate the driving current IDRV.

That is, the current source (first current source circuit) of the IPTAT is turned on in a first temperature interval TX1 between a first temperature T1 and a second temperature T2, and outputs the IPTAT current (positive temperature coefficient current). The current source (second current source circuit) of the ICTAT is turned on in a second temperature interval TX2 between a third temperature T3 and a fourth temperature T4, and outputs the ICTAT current (negative temperature coefficient current). In a third temperature interval TX3 between the second temperature T2 and the third temperature T3, the current source of the IPTAT and the current source of the ICTAT are turned off.

In an embodiment, the room temperature RT is, for example, 27 degrees Celsius, and the first temperature T1 and the fourth temperature T4 are, for example, 100 degrees Celsius and minus 40 degrees Celsius. None of the above temperature values are intended to limit the disclosure.

Figure 4:
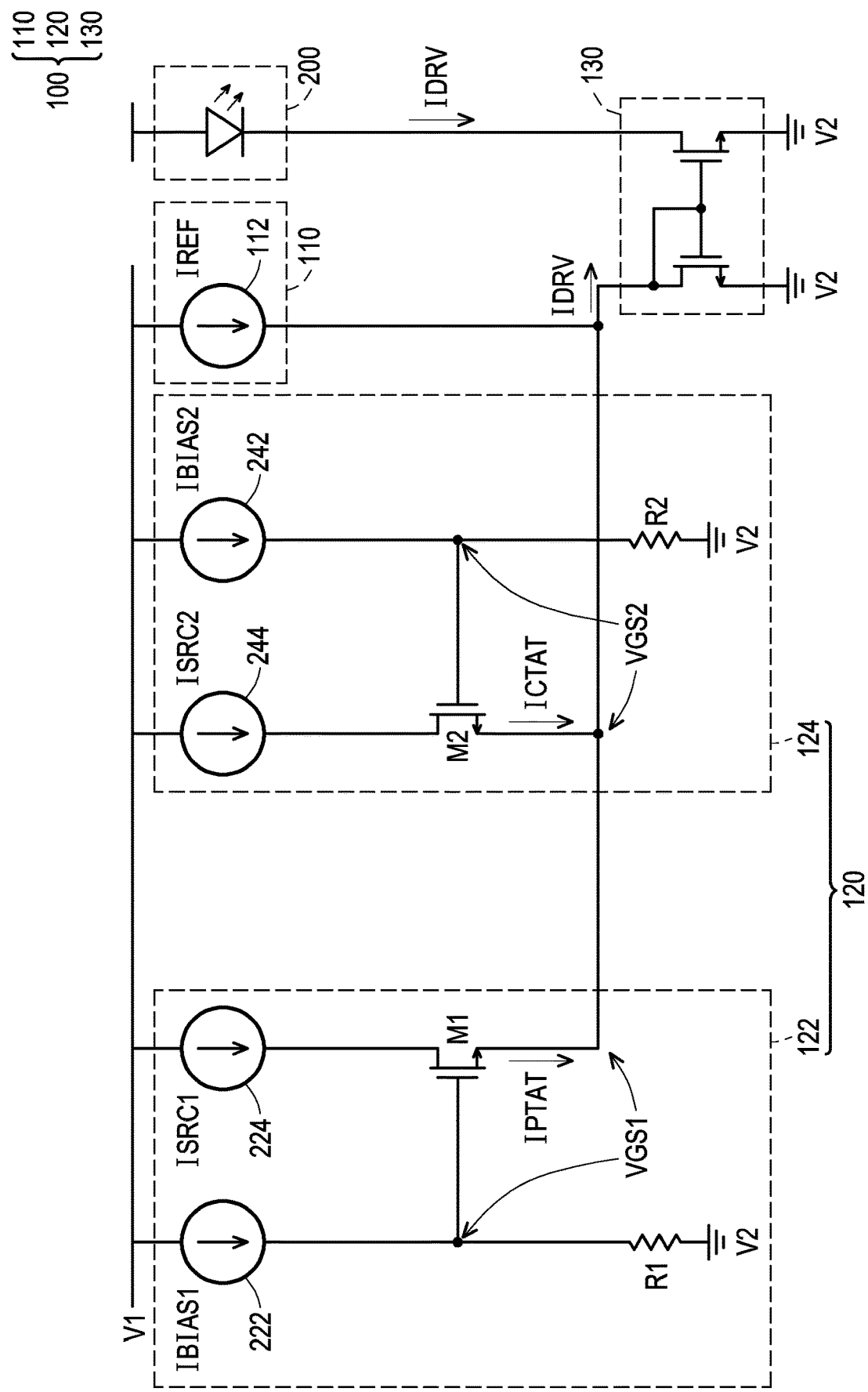
FIG. 4 is a schematic circuit diagram illustrating a current driving circuit suitable for driving a light-emitting device according to an embodiment of the disclosure.

FIG. 4 is a schematic circuit diagram illustrating a current driving circuit suitable for driving a light-emitting device according to an embodiment of the disclosure. Referring to FIG. 4, in this embodiment, the driver circuit 130 has a current mirror structure to map the received driving current IDRV to the light source side to drive the light-emitting device 200, but the disclosure is not limited thereto. The first current generating circuit 110 includes a reference current source 112. The reference current source 112 is configured to generate the reference current IREF. The second current generating circuit 120 includes a first current source circuit 122 and a second current source circuit 124.

Specifically, the first current source circuit 122 includes a positive temperature variable resistor R1. The first current source circuit 122 generates the positive temperature coefficient current IPTAT according to the positive temperature variable resistor R1. The first current source circuit 122 outputs the positive temperature coefficient current IPTAT, as the compensation current ICOMP, in the first temperature interval TX1 between the first temperature T1 and the second temperature T2. The second temperature T2 is configured as a first critical temperature at which the positive temperature coefficient current IPTAT may be output. In the first temperature interval TX1 between the first temperature T1 and the second temperature T2, the sum of the positive temperature coefficient current IPTAT (as the compensation current ICOMP) and the reference current IREF is configured as the driving current IDRV driving the light-emitting device 200 to compensate for the effect that the output power of the light-emitting device 200 varies as the temperature rises, thereby outputting a stable power. In this embodiment, the first temperature T1 is higher than the second temperature T2. The first temperature T1 may be, for example, 100 degrees Celsius; the second temperature T2 may be, for example, 50 degrees Celsius. The first temperature T1 and the second temperature T2 are selected based on the design requirement of the positive temperature variable resistor, and shall not be construed as being limited to the above.

In detail, the first current source circuit 122 may include a first bias current source 222, a first current source 224, and a first switching element M1. The first bias current source 222 is configured to provide a current IBIAS1. The first bias current source 222 has a first end and a second end. The first end of the first bias current source 222 is coupled to a first voltage V1. The first voltage V1 is, for example, a system high voltage. The second end of the first bias current source 222 is coupled to the positive temperature variable resistor R1 and the first switching element M1. The first current source 224 is configured to provide the current ISRC1. The first current source 224 has a first end and a second end. The first end of the first current source 224 is coupled to the first voltage V1; the second end of the first current source 224 is coupled to the first switching element M1.

In this embodiment, the first switching element M1 is a transistor, for example. The first transistor element M1 is, for example, an N-type metal-oxide-semiconductor (NMOS) transistor element, but the disclosure is not limited thereto. In an embodiment, the first transistor element M1 may also be a P-type metal-oxide-semiconductor (PMOS) transistor element. The first transistor element M1 has a first end (e.g., a source), a second end (e.g., a drain) and a control end (e.g., a gate). The first end of the first transistor element M1 is coupled to the second end of the first current source 224. The second end of the first transistor element M1 is coupled to the driver circuit 130. The control end of the first transistor element M1 is coupled to the second end of the first bias current source 222. The positive temperature variable resistor R1 has a first end and a second end. The first end of the positive temperature variable resistor R1 is coupled to the second end of the first bias current source 222. The second end of the positive temperature variable resistor R1 is coupled to a second voltage V2. The second voltage V2 is, for example, a system low voltage (may be a ground voltage, but the disclosure is not limited thereto). The positive temperature coefficient current IPTAT is output from the second end of the first transistor element M1 to the driver circuit 130.

On the other hand, the second current source circuit 124 includes a negative temperature variable resistor R2. The second current source circuit 124 generates the negative temperature coefficient current ICTAT according to the negative temperature variable resistor R2. The second current source circuit 124 outputs the negative temperature coefficient current ICTAT as the compensation current ICOMP in the second temperature interval TX2 between the third temperature T3 and the fourth temperature T4. The third temperature T3 is configured as a second critical temperature at which the negative temperature coefficient current ICTAT may be output. In the second temperature interval TX2 between the third temperature T3 and the fourth temperature T4, the sum of the negative temperature coefficient current ICTAT and the reference current IREF is configured as the driving current IDRV driving the light-emitting device 200 to compensate for the effect that the output power of the light-emitting device 200 varies as the temperature decreases, thereby outputting a stable power. The third temperature T3 is higher than the fourth temperature T4, and the second temperature T2 is higher than the third temperature T3. The third temperature T3 may be, for example, 10 degrees Celsius; the fourth temperature T4 may be, for example, minus 40 degrees Celsius. The third temperature T3 and the fourth temperature T4 are selected according to the design requirement of the negative temperature variable resistor, and shall not be construed as being limited to the above.

In detail, the second current source circuit 124 may include a second bias current source 242, a second current source 244, and a second switching element M2. The second bias current source 242 is configured to provide a current IBIAS2. The second bias current source 242 has a first end and a second end. The first end of the second bias current source 242 is coupled to the first voltage V1. The second end of the second bias current source 242 is coupled to the negative temperature variable resistor R2 and the second switching element M2. The second current source 244 is configured to provide the current ISRC1. The second current source 244 has a first end and a second end. The first end of the second current source 244 is coupled to the first voltage V1. The second end of the second current source 244 is coupled to the second switching element M2.

In this embodiment, the second switching element M2 is a transistor, for example. The second transistor element M2 is, for example, an NMOS transistor element, but the disclosure is not limited thereto. In an embodiment, the second transistor element M2 may also be a PMOS transistor element. The second transistor element M2 has a first end (e.g., a source), a second end (e.g., a drain) and a control end (e.g., a gate). The first end of the second transistor element M2 is coupled to the second end of the second current source 244. The second end of the second transistor element M2 is coupled to the driver circuit 130. The control end of the second transistor element M2 is coupled to the second end of the second bias current source 242. The negative temperature variable resistor R2 has a first end and a second end. The first end of the negative temperature variable resistor R2 is coupled to the second end of the second bias current source 242. The second end of the negative temperature variable resistor R2 is coupled to the second voltage V2. The negative temperature coefficient current ICTAT is output from the second end of the second transistor element M2 to the driver circuit 130.

In this embodiment, the first current source circuit 122 and the second current source circuit 124 do not output the positive temperature coefficient current IPTAT and the negative temperature coefficient current ICTAT in the third temperature interval TX3 between the second temperature T2 and the third temperature T3. The driver circuit 130 receives the reference current IREF, and configures the reference current IREF as the driving current IDRV to drive the light-emitting device 200.

In FIG. 4, in order to generate the nonlinear driving current IDRV, for example, the current driving circuit 100 includes two temperature coefficient of resistance (TCR) resistors R1 and R2 with different types and characteristics. The positive temperature coefficient current IPTAT is generated by the positive temperature variable resistor R1, the first switching element M1, and the first current source 224. The first bias current source 222 is configured to bias the positive temperature variable resistor R1 to establish a sufficient cross voltage VGS1 to turn on the first switching element M1 in a predetermined temperature interval. The negative temperature coefficient current ICTAT is generated by the negative temperature variable resistor R2, the second switching element M2, and the second current source 244. The second bias current source 242 is configured to bias the negative temperature variable resistor R2 to establish a sufficient cross voltage VGS2 to make the second switching element M2 conductive in a predetermined temperature interval.

At the room temperature RT, the cross voltages of the positive temperature variable resistor R1 and the negative temperature variable resistor R2 are insufficient to make the first switching element M1 and the second switching element M2 conductive. Therefore, the first current generating circuit 110 is configured as the current source of the current driving circuit 100, that is, the first current generating circuit 110 provides the reference current IREF to the driver circuit 130 as the driving current IDRV of the current driving circuit 100 to drive the light-emitting device 200.

As the temperature rises, the cross voltage VGS1 of the positive temperature variable resistor R1 increases. When the temperature reaches the second temperature T2, the cross voltage VGS1 is high enough to make the first switching element M1 conductive, so the current ISRC1 may be output from the first switching element M1 as the positive temperature coefficient current IPTAT and supplied to the driver circuit 130. Since the overdrive voltage of the first switching element M1 becomes higher when the temperature is higher than the second temperature T2, the positive temperature coefficient current IPTAT supplied to the driver circuit 130 becomes larger. In the first temperature interval TX1 between the first temperature T1 and the second temperature T2, the second current generating circuit 120 outputs the positive temperature coefficient current IPTAT as the compensation current ICOMP. In a temperature range higher than the second temperature T2 and lower than the first temperature T1, the behavior of the compensation current ICOMP that is input into the driver circuit 130 is a current behavior that is positively correlated to the temperature. In a temperature range higher than the third temperature T3, the cross voltage VGS2 of the negative temperature variable resistor R2 is insufficient to turn on the second switching element M2. Therefore, the first current generating circuit 110 and the first current source circuit 122 are configured as the current source of the current driving circuit 100, and respectively provide the reference current IREF and the positive temperature coefficient current IPTAT to the driver circuit 130, and are configured as the driving current IDRV of the current driving circuit 100 to drive the light-emitting device 200.

As the temperature drops, the cross voltage VGS2 of the negative temperature variable resistor R2 increases. When the temperature drops to the third temperature T3, the cross voltage VGS2 is sufficiently high to make the second switching element M2 conductive, so the current ISRC2 may be output from the second switching element M2 as the negative temperature coefficient current ICTAT and supplied to the driver circuit 130. Since the overdrive voltage of the second switching element M2 becomes higher when the temperature is below the third temperature T3, the negative temperature coefficient current ICTAT supplied to the driver circuit 130 becomes larger. In the second temperature interval TX2 between the third temperature T3 and the fourth temperature T4, the second current generating circuit 120 outputs the negative temperature coefficient current ICTAT as the compensation current ICOMP. In a temperature range lower than the third temperature T3 and higher than the fourth temperature T4, the behavior of the compensation current ICOMP that is input to the driver circuit 130 is a current behavior that is negatively correlated to the temperature. In the temperature range lower than the second temperature T2, the cross voltage VGS1 of the positive temperature variable resistor R1 is insufficient to turn on the first switching element M1. Therefore, the first current generating circuit 110 and the second current source circuit 124 are configured as the current source of the current driving circuit 100 and respectively provide the reference current IREF and the negative temperature coefficient current ICTAT to the driver circuit 130, and are configured as the driving current IDRV of the current driving circuit 100 to drive the light-emitting device 200.

Figure 5:
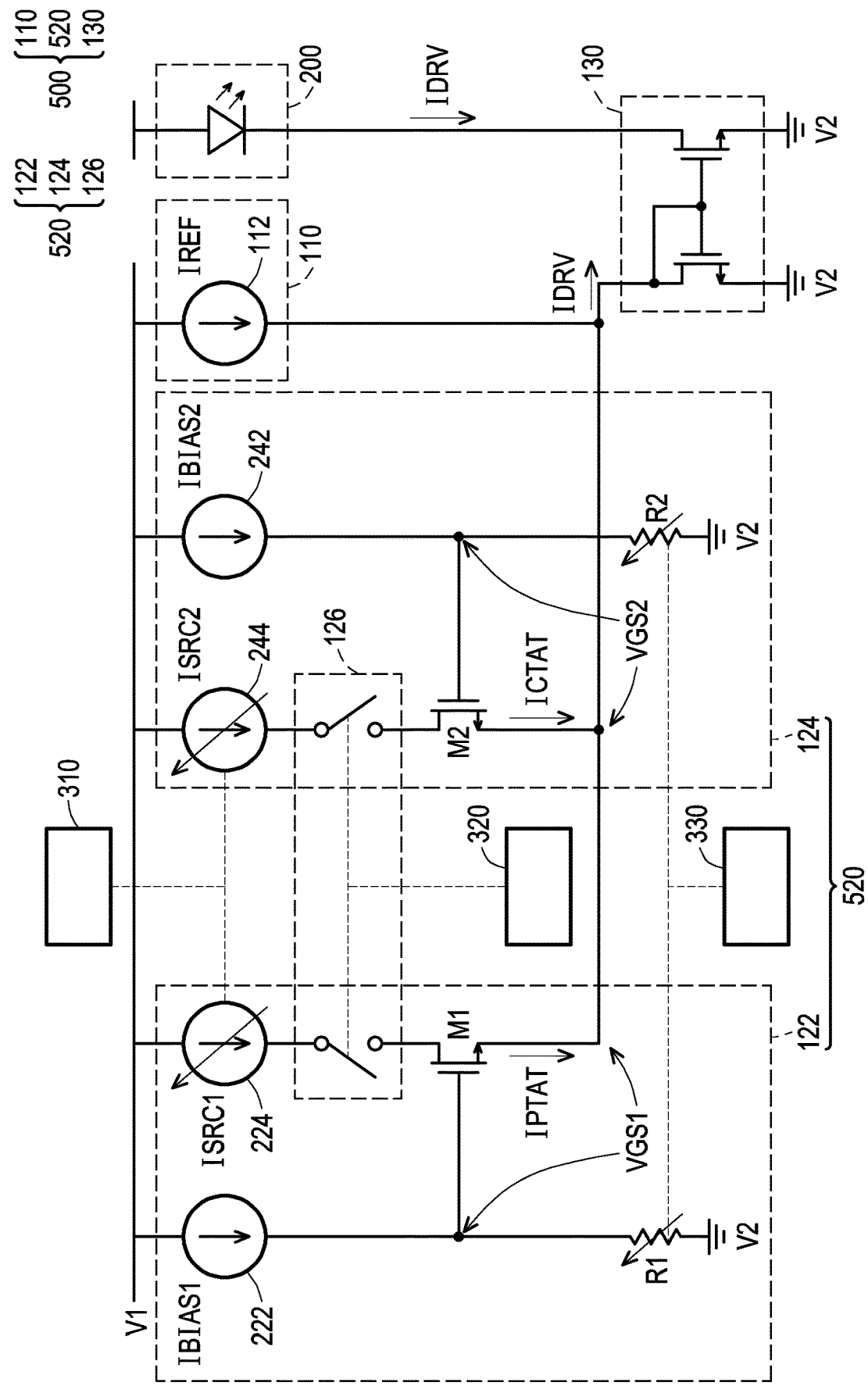
FIG. 5 is a schematic circuit diagram illustrating a current driving circuit suitable for driving a light-emitting device according to another embodiment of the disclosure.

FIG. 5 is a schematic circuit diagram illustrating a current driving circuit suitable for driving a light-emitting device according to another embodiment of the disclosure. Referring to FIG. 4 and FIG. 5, a current driving circuit 500 of FIG. 5 is similar to the current driving circuit 100 of FIG. 4. The main difference between the two is, for example, that the current driving circuit 500 further includes control circuits 310, 320, and 330, and a switching circuit 126.

Figure 6:
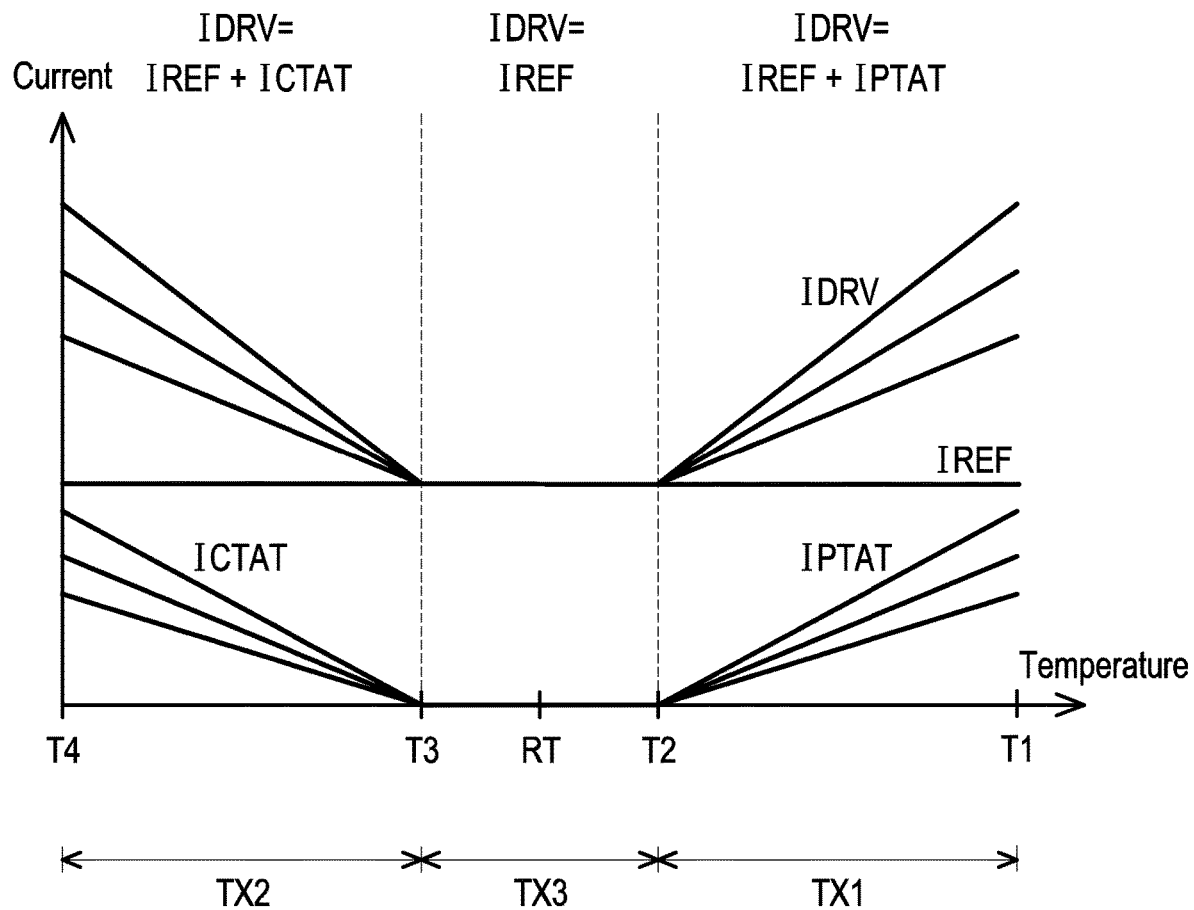
FIG. 6 is a schematic diagram illustrating a nonlinear variation of a driving current as the temperature changes according to another embodiment of the disclosure.

Specifically, FIG. 6 is a schematic diagram illustrating a nonlinear variation of a driving current as the temperature changes according to another embodiment of the disclosure. Referring to FIG. 5 and FIG. 6 together, the first control circuit 310 is coupled to the first current source circuit 122 and the second current source circuit 124. The first control circuit 310 controls the current slope of the positive temperature coefficient current IPTAT in the first temperature interval TX1 by controlling the first current source 224. The first control circuit 310 controls the current slope of the negative temperature coefficient current ICTAT in the second temperature interval TX2 by controlling the second current source 244. FIG. 6 shows different current slopes of the positive temperature coefficient current IPTAT and the negative temperature coefficient current ICTAT, and through the control of the first control circuit 310, the current slope of the driving current IDRV in the first temperature interval TX1 and the second temperature interval TX2 may be adjusted.

In this embodiment, a second current generating circuit 520 includes the switching circuit 126. The switching circuit 126 is configured to control whether the second current generating circuit 520 outputs the compensation current ICOMP. The second control circuit 320 is coupled to the switching circuit 126. The second control circuit 320 is configured to control the conduction state of the switching circuit 126. The second control circuit 320 is configured to independently turn on or off the current transmission paths of the currents ISRC1 and ISRC2, and may serve to realize applications that only require the positive temperature coefficient current IPTAT or the negative temperature coefficient current ICTAT.

Figure 7:
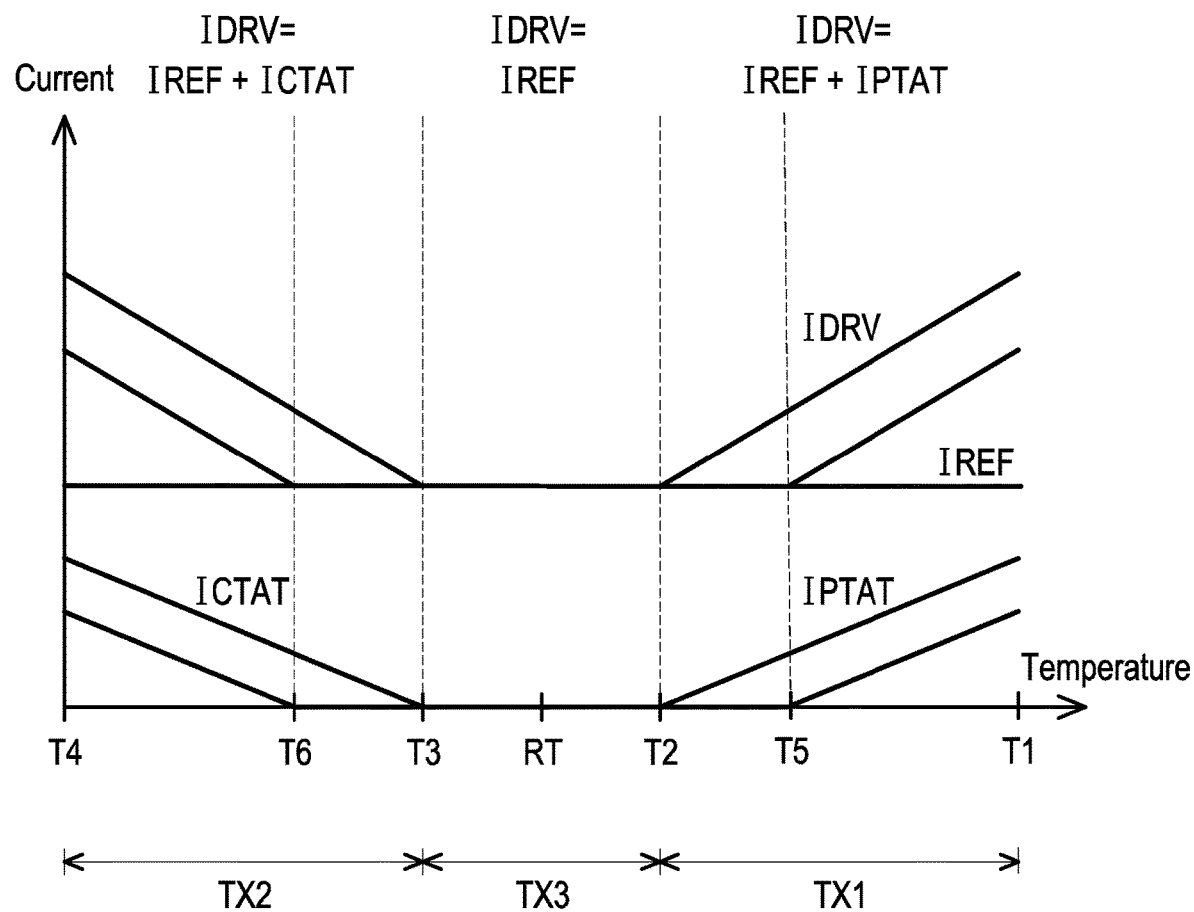
FIG. 7 is a schematic diagram illustrating a nonlinear variation of a driving current as the temperature changes according to another embodiment of the disclosure.

On the other hand, FIG. 7 is a schematic diagram illustrating a nonlinear variation of a driving current as the temperature changes according to another embodiment of the disclosure. Referring to FIG. 5 and FIG. 7 together, the third control circuit 330 is coupled to the variable resistors R1 and R2. The third control circuit 330 is configured to control the temperature interval in which the second current generating circuit 520 outputs the compensation current ICOMP. For example, the third control circuit 330 is configured to independently adjust the conduction temperatures of the variable resistors R1 and R2 so that the third control circuit 330 may realize adjusting the temperatures at which the first current source circuit 122 and the second current source circuit 124 begin to operate. FIG. 7 shows that the conduction temperature of the first switching element M1 may be raised from the second temperature T2 to a fifth temperature 15, and the conduction temperature of the second switching element M2 is reduced from the third temperature T3 to a sixth temperature T6. That is, the conduction temperatures of the first switching element M1 and the second switching element M2 may be adjusted respectively.

In this embodiment, the control circuits 310, 320, and 330 may be implemented in the same or different circuit blocks. For example, the control circuits 310, 320, 330 may be integrated into the second current generating circuit 520. In another embodiment, the control circuits 310, 320, 330 may be independent components of the second current generating circuit 520, but the disclosure is not particularly limited in this regard. The control circuits 310, 320, and 330 may be designed through a hardware description language (HDL) or any other digital circuit design method known to those with ordinary knowledge in the art, and implemented through a field programmable logic gate array (FPGA), a complex programmable logic device (CPLD), or an application-specific integrated circuit (ASIC).

In the embodiment of the disclosure, the first switching element M1 and the second switching element M2 are not limited to NMOS transistor elements. In addition, the first switching element M1 and the second switching element M2 are not limited to the control currents ISRC1 and ISRC2. Various combinations of the variable resistors R1, R2, the first switching element M1, and the second switching element M2 and other electronic components may be configured to generate the positive temperature coefficient current IPTAT and the negative temperature coefficient current ICTAT.

In an embodiment, the control circuits 310, 320, and 330, and the switching circuit 126 may all be disposed in the second current generating circuit 520. That is, the second current generating circuit 520 further includes the control circuits 310, 320, and 330, and the switching circuit 126.

Figure 8:
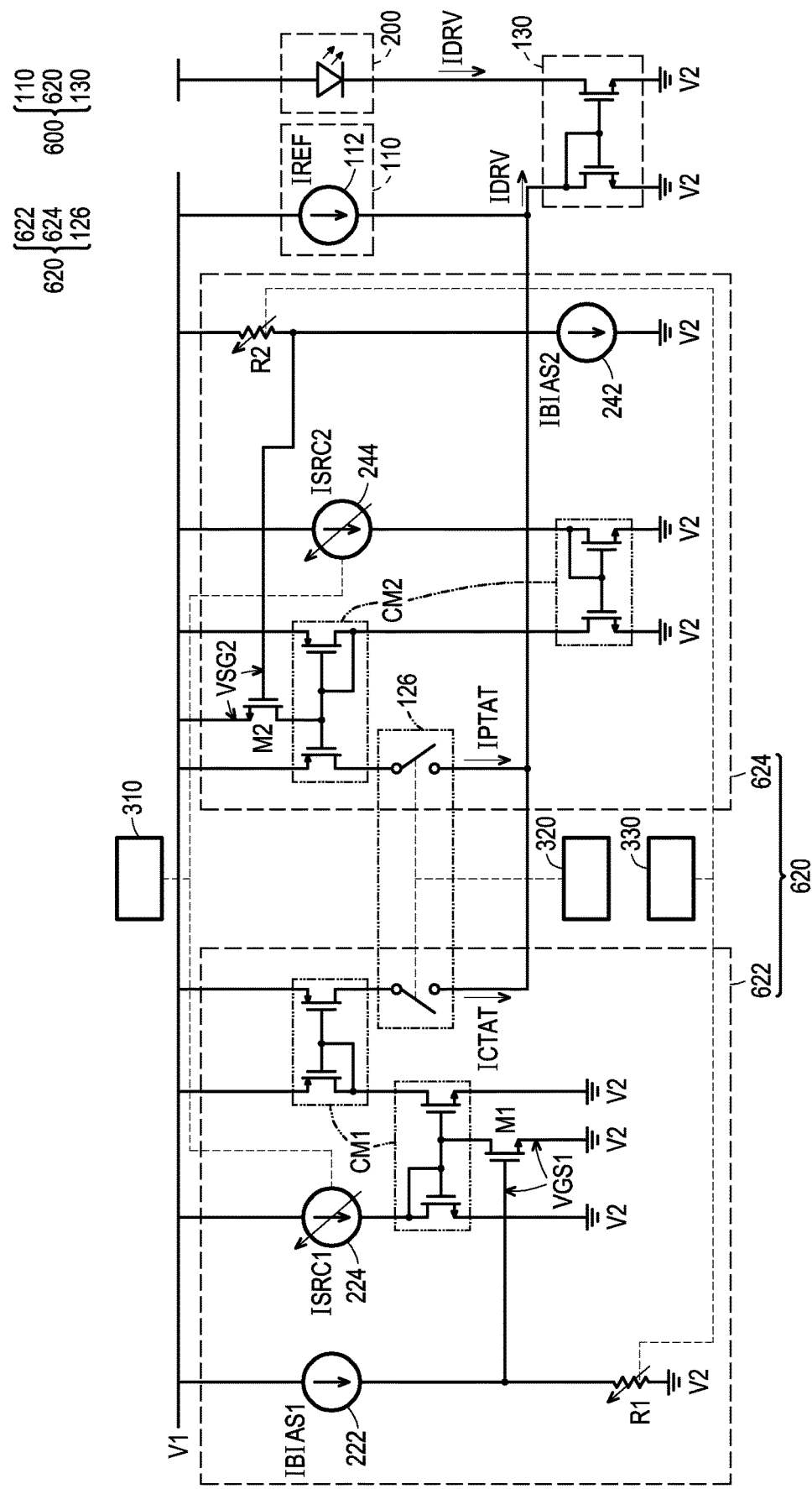
FIG. 8 is a schematic circuit diagram illustrating a current driving circuit suitable for driving a light-emitting device according to another embodiment of the disclosure.

FIG. 8 is a schematic circuit diagram illustrating a current driving circuit suitable for driving a light-emitting device according to another embodiment of the disclosure. Referring to FIG. 5 and FIG. 8, a current driving circuit 600 of FIG. 8 is similar to the current driving circuit 500 of FIG. 5. The main difference between the two is, for example, that the current driving circuit 600 further includes at least one current mirror circuit (CM1 and/or CM2). In this embodiment, the first switching element M1 is an NMOS transistor element, and the first current mirror circuit CM1 is respectively coupled to the positive temperature variable resistor R1 and the first switching element M1; the second switching element M2 is a PMOS transistor element, and the second current mirror circuit CM2 is respectively coupled to the negative temperature variable resistor R2 and the second switching element M2. In this embodiment, the current mirror circuits CM1/CM2 may be configured to control a second current generating circuit 620 to output the compensation current ICOMP by turning on and off the switching element according to the cross voltage of the at least one variable resistor in different temperature intervals.

Specifically, a first current source circuit 622 further includes the first current mirror circuit CM1, and a second current source circuit 624 further includes the second current mirror circuit CM2. In the first current source circuit 622, the first bias current source 222 has a first end and a second end. The first end of the first bias current source 222 is coupled to the first voltage V1. The second end of the first bias current source 222 is coupled to the positive temperature variable resistor R1 and the first switching element M1. The first current source 224 has a first end and a second end. The first end of the first current source 224 is coupled to the first voltage V1, and the second end of the first current source 224 is coupled to the first switching element M1 through the first current mirror circuit CM1.

The first switching element M1 has a first end, a second end, and a control end. The first end of the first switching element M1 is coupled to the second end of the first current source 224 through the first current mirror circuit CM1. The second end of the first switching element M1 is coupled to the second voltage V2. The control end of the first switching element M1 is coupled to the positive temperature variable resistor R1. The positive temperature variable resistor R1 has a first end and a second end. The first end of the positive temperature variable resistor R1 is coupled to the second end of the first bias current source 222, and the second end of the positive temperature variable resistor R1 is coupled to the second voltage V2. The negative temperature coefficient current ICTAT is output from the first current mirror circuit CM1 to the driver circuit 130 through the switching circuit 126.

In the second current source circuit 624, the second bias current source 242 has a first end and a second end. The first end of the second bias current source 242 is coupled to the negative temperature variable resistor R2. The second end of the second bias current source 242 is coupled to the second voltage V2. The second current source 244 has a first end and a second end. The first end of the second current source 244 is coupled to the first voltage V1, and the second end of the second current source 244 is coupled to the second voltage V2 through the second current mirror circuit CM2.

The second switching element M2 has a first end, a second end, and a control end. The first end of the second switching element M2 is coupled to the first voltage V1. The second end of the second switching element M2 is coupled to the driver circuit 130 through the second current mirror circuit CM2. The control end of the second switching element M2 is coupled to the first end of the second bias current source 244. The negative temperature variable resistor R2 has a first end and a second end. The first end of the negative temperature variable resistor R2 is coupled to the first voltage V1, and the second end of the negative temperature variable resistor R2 is coupled to the first end of the second bias current source 242.

In this embodiment, the first switching element M1 and the second switching element M2 may respectively control the gates of the current mirror circuits CM1 and CM2. The first bias current source 222 is paired with the positive temperature variable resistor R1, and the second bias current source 242 is paired with the negative temperature variable resistor R2.

At the room temperature RT, the cross voltage VGS1 of the first switching element M1 and the cross voltage (V1-VSG2) of the second switching element M2 are sufficiently high to turn on the first switching element M1 and the second switching element M2 and pull the gate voltages of the current mirror circuits CM1 and CM2 to the second voltage V2, such as a ground voltage. Therefore, neither the positive temperature coefficient current IPTAT nor the negative temperature coefficient current ICTAT is supplied to the driver circuit 130, but only the reference current IREF is supplied to the driver circuit 130. That is, in the third temperature interval TX3, the current mirror circuits CM1 and CM2 control the second current generating circuit 620 not to output the compensation circuit ICOMP according to the cross voltage VGS1 of the positive temperature variable resistor R1 and the cross voltage (V1-VSG2) of the negative temperature variable resistor R2. The driver circuit 130 receives the reference current IREF, and configures the reference current IREF as the driving current IDRV to drive the light-emitting device 200.

As the temperature decreases, the cross voltage VGS1 of the positive temperature variable resistor R1 decreases. When the temperature reaches the third temperature T3, the gate voltage of the first current mirror circuit CM1 begins to increase, and the switching element, which is coupled to the first current mirror circuit CM1, in the switching circuit 126 becomes conductive (turns on). Thus, the current ISRC1 (as the negative temperature coefficient current ICTAT) is supplied to the driver circuit 130. Since the overdriving voltage of the first switching element M1 becomes lower and lower when the temperature is below the third temperature T3, the negative temperature coefficient current ICTAT supplied to the driver circuit 130 becomes larger. In a temperature range lower than the third temperature T3 and higher than the fourth temperature T4, the behavior of the negative temperature coefficient current ICTAT that is input to the driver circuit 130 is a current behavior that is negatively correlated to the temperature. In a low temperature region (the second temperature interval TX2), the current of the driver circuit 130 is provided by the negative temperature coefficient current ICTAT and the reference current IREF. That is, in the second temperature interval TX2, the first current mirror circuit CM1 controls the first current source circuit 622 of the second current generation circuit 620 to output the negative temperature coefficient current ICTAT as the compensation current ICOMP according to the cross voltage VGS1 of the positive temperature variable resistor R1.

Briefly, referring to FIG. 8, in the embodiment, the first current source circuit 622 includes the positive temperature variable resistor R1. The first current source circuit 622 generates the negative temperature coefficient current ICTAT according to the positive temperature variable resistor R1. The first current source circuit 622 outputs the negative temperature coefficient current ICTAT as the compensation current ICOMP in the second temperature interval TX2 between the third temperature T3 and the fourth temperature T4. The sum of the negative temperature coefficient current ICTAT and the reference current IREF is configured as the driving current IDRV to drive the light-emitting device 200.

As the temperature rises, the cross voltage (V1-VSG2) of the negative temperature variable resistor R2 decreases. When the temperature reaches the second temperature T2, the gate voltage of the second current mirror circuit CM2 begins to decrease, and the switching element, which is coupled to the second current mirror circuit CM2, in the switching circuit 126 becomes conductive. Thus, the current ISRC2 (as the positive temperature coefficient current IPTAT) is supplied to the driver circuit 130. Since the overdriving voltage of the second switching element M2 becomes lower and lower when the temperature is above the second temperature T2, the positive temperature coefficient current IPTAT supplied to the driver circuit 130 becomes larger. In a temperature range higher than the second temperature T2 and lower than the first temperature T1, the behavior of the positive temperature coefficient current IPTAT that is input to the driver circuit 130 is a current behavior that is positively correlated to the temperature. In a high temperature region (the first temperature interval TX1), the current of the driver circuit 130 is provided by the positive temperature coefficient current IPTAT and the reference current IREF. That is, in the first temperature interval TX1, the second current mirror circuit CM2 controls the second current source circuit 624 of the second current generation circuit 620 to output the positive temperature coefficient current IPTAT as the compensation current ICOMP according to the cross voltage (V1-VSG2) of the negative temperature variable resistor R2.

Briefly, referring to FIG. 8, in the embodiment, the second current source circuit 624 includes a negative temperature variable resistor R2. The second current source circuit 624 generates a positive temperature coefficient current IPTAT according to the negative temperature variable resistor R2. The second current source circuit 624 outputs the positive temperature coefficient current IPTAT as the compensation current ICOMP in the first temperature interval TX1 between the first temperature T1 and the second temperature T2. The sum of the positive temperature coefficient current IPTAT and the reference current IREF is configured as the driving current IDRV to drive the light-emitting device 200.

To sum up, to cope with the instability and inaccuracy of optical measurement due to the nonlinear variation of the output power of the light-emitting device (e.g. VCSEL) as the temperature changes, the embodiments of the disclosure provide a current driving circuit to compensate for the characteristic of the nonlinear variation of the output power of the light-emitting device as the temperature changes. With the current driving circuit according to the embodiments of the disclosure, the optical measurement system is capable of providing stable and accurate optical measurements. In the embodiment of the disclosure, by providing compensation currents in the low temperature region and the high temperature region, respectively, the current driving circuit is capable of providing nonlinear driving currents complementary to each other at a low temperature and a high temperature relative to the room temperature, to drive the light-emitting device with an output power that varies nonlinearly as the temperature changes. Therefore, the current driving circuit is capable of providing a nonlinear driving current to compensate for the light-emitting device with an output power that varies nonlinearly as the temperature changes. In other words, according to the disclosure, the driving current is adjusted instantaneously and continuously as the operating temperature differs. As a result, the power of the light-emitting device of the optical measurement system remains stable throughout the entire temperature range, and a distance measurement can be carried out accurately.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the descriptions detailed above.

What is claimed is:

1. A current driving circuit, suitable for driving a light-emitting device, the current driving circuit comprising:
a first current generating circuit, configured to generate a reference current, wherein the reference current is configured as a current that is not related to an operating temperature of the light-emitting device;
a second current generating circuit, comprising at least one variable resistor, wherein the second current generating circuit generates a compensation current according to the at least one variable resistor, the resistance of the at least one variable resistor is variable during the operation of the current driving circuit, and the at least one variable resistor is selected from at least one of a positive temperature variable resistor and a negative temperature variable resistor; and
a driver circuit, coupled to the first current generating circuit and the second current generating circuit, and configured to receive the reference current and the compensation current as a driving current, wherein the driver circuit outputs the driving current to drive the light-emitting device.

2. The current driving circuit according to claim 1, wherein the at least one variable resistor comprises the positive temperature variable resistor, and the second current generating circuit comprises:
a first current source circuit, comprising the positive temperature variable resistor, wherein the first current source circuit generates a positive temperature coefficient current according to the positive temperature variable resistor, the first current source circuit outputs the positive temperature coefficient current as the compensation current in a first temperature interval between a first temperature and a second temperature, and a sum of the positive temperature coefficient current and the reference current is configured as the driving current to drive the light-emitting device, wherein the first temperature is higher than the second temperature, and the second temperature is a first critical temperature.

3. The current driving circuit according to claim 2, wherein the first current source circuit further comprises:
a first bias current source, having a first end and a second end, wherein the first end of the first bias current source is coupled to a first voltage;
a first current source, having a first end and a second end, wherein the first end of the first current source is coupled to the first voltage; and
a first switching element, having a first end, a second end, and a control end, wherein the first end of the first switching element is coupled to the second end of the first current source, the second end of the first switching element is coupled to the driver circuit, and the control end of the first switching element is coupled to the second end of the first bias current source, wherein the positive temperature coefficient current is output from the second end of the first switching element,
wherein the positive temperature variable resistor has a first end and a second end, the first end of the positive temperature variable resistor is coupled to the second end of the first bias current source, and the second end of the positive temperature variable resistor is coupled to a second voltage.

4. The current driving circuit according to claim 2, wherein the at least one variable resistor further comprises the negative temperature variable resistor, and the second current generating circuit comprises:
a second current source circuit, comprising the negative temperature variable resistor, wherein the second current source circuit generates a negative temperature coefficient current according to the negative temperature variable resistor, the second current source circuit outputs the negative temperature coefficient current as the compensation current in a second temperature interval between a third temperature and a fourth temperature, a sum of the negative temperature coefficient current and the reference current is configured as the driving current to drive the light-emitting device, wherein the third temperature is a second critical temperature and is higher than the fourth temperature, and the second temperature is higher than the third temperature.

5. The current driving circuit according to claim 4, wherein in a third temperature interval between the second temperature and the third temperature, the first current source circuit outputs the reference current, the second current source circuit does not output the positive temperature coefficient current and the negative temperature coefficient current, and the driver circuit receives the reference current as the driving current.

6. The current driving circuit according to claim 4, further comprising: a first control circuit coupled to the first current source circuit and the second current source circuit and configured to regulate current slopes of the positive temperature coefficient current and the negative temperature coefficient current.

7. The current driving circuit according to claim 6, further comprising: a switching circuit coupled to the first current source circuit and the second current source circuit and configured to control whether the first current source circuit and the second current source circuit output the compensation current, wherein the current driving circuit further comprises a second control circuit coupled to the switching circuit and configured to control a conduction state of the switching circuit.

8. The current driving circuit according to claim 7, further comprising a third control circuit coupled to the positive temperature variable resistor and the negative temperature variable resistor and configured to regulate a temperature interval in which the second current generating circuit outputs the compensation current.

9. The current driving circuit according to claim 1, wherein the at least one variable resistor comprises the negative temperature variable resistor, and the second current generating circuit comprises:
a second current source circuit, comprising the negative temperature variable resistor, wherein the second current source circuit generates a negative temperature coefficient current according to the negative temperature variable resistor, the second current source circuit outputs the negative temperature coefficient current as the compensation current in a second temperature interval between a third temperature and a fourth temperature, and a sum of the negative temperature coefficient current and the reference current is configured as the driving current to drive the light-emitting device, wherein the third temperature is a second critical temperature, and the third temperature is higher than the fourth temperature.

10. The current driving circuit according to claim 9, wherein the second current source circuit further comprises:
a second bias current source, having a first end and a second end, wherein the first end of the second bias current source is coupled to the first voltage;
a second current source, having a first end and a second end, wherein the first end of the second current source is coupled to the first voltage; and
a second switching element, having a first end, a second end, and a control end, wherein the first end of the second switching element is coupled to the second end of the second current source, the second end of the second switching element is coupled to the driver circuit, and the control end of the second switching element is coupled to the second end of the second bias current source, wherein the negative temperature coefficient current is output from the second end of the second switching element,
wherein the negative temperature variable resistor has a first end and a second end, the first end of the negative temperature variable resistor is coupled to the second end of the second bias current source, and the second end of the negative temperature variable resistor is coupled to the second voltage.

11. The current driving circuit according to claim 1, further comprising at least one current mirror circuit coupled to the at least one variable resistor and configured to control whether the second current generating circuit outputs the compensation current according to a cross voltage of the at least one variable resistor in different temperature intervals.

12. The current driving circuit according to claim 1, wherein the second current generating circuit comprises a first control circuit, configured to regulate a current slope of the compensation current.

13. The current driving circuit according to claim 1, wherein the second current generating circuit comprises a switching circuit, configured to control whether the second current generating circuit outputs the compensation current, and the second current generating circuit comprises a second control circuit coupled to the switching circuit and configured to control a conduction state of the switching circuit.

14. The current driving circuit according to claim 1, wherein the second current generating circuit comprises a third control circuit coupled to the at least one variable resistor and configured to regulate a temperature interval in which the second current generating circuit outputs the compensation current.

15. The current driving circuit according to claim 1, wherein the at least one variable resistor comprises the positive temperature variable resistor and the negative temperature variable resistor, and the second current generating circuit comprises a first current source circuit and a second current source circuit, wherein:
the second current source circuit comprises the negative temperature variable resistor, the second current source circuit generates a positive temperature coefficient current according to the negative temperature variable resistor, the second current source circuit outputs the positive temperature coefficient current as the compensation current in a first temperature interval between a first temperature and a second temperature, and a sum of the positive temperature coefficient current and the reference current is configured as the driving current to drive the light-emitting device, wherein the first temperature is higher than the second temperature, and the second temperature is a first critical temperature, and
the first current source circuit comprises a positive temperature variable resistor, the first current source circuit generates a negative temperature coefficient current according to the positive temperature variable resistor, the first current source circuit outputs the negative temperature coefficient current as the compensation current in a second temperature interval between a third temperature and a fourth temperature, and a sum of the negative temperature coefficient current and the reference current is configured as the driving current to drive the light-emitting device, wherein the third temperature is a second critical temperature, the second critical temperature is lower than the first critical temperature, and the third temperature is higher than the fourth temperature.

16. The current driving circuit according to claim 15, wherein the first current source circuit further comprises a first current mirror circuit and a first switching element, the second current source circuit further comprises a second current mirror circuit and a second switching element, and wherein the first switching element is coupled to the positive temperature variable resistor and the first current mirror circuit, the second switching element is coupled to the negative temperature variable resistor and the second current mirror circuit.

17. The current driving circuit according to claim 1, wherein the light-emitting device comprises a vertical-cavity surface-emitting laser.

18. A current driving circuit, configured in an optoelectronic device to adjust a modulation current of a light-emitting device as the temperature changes, wherein the current driving circuit comprises:
 a current modulation circuit, configured to generate a reference current and a compensation current, the current modulation circuit comprises at least one variable resistor, wherein the resistance of the at least one variable resistor is variable during the operation of the current driving circuit, and the current modulation circuit generates the compensation current according to the at least one variable resistor, so that the current modulation circuit is configured to modulate and output the compensation current in different temperature intervals, wherein the reference current is configured as a current that is not related to an operating temperature of the light-emitting device; and
 a driver circuit, coupled to the current modulation circuit and configured to receive the reference current and the compensation current, wherein a sum of the reference current and the compensation current is configured as a driving current, wherein the driver circuit outputs the driving current to drive the light-emitting device.

19. The current driving circuit according to claim 18, wherein the at least one variable resistor is selected from at least one of a positive temperature variable resistor and a negative temperature variable resistor.

20. The current driving circuit according to claim 18, wherein the current modulation circuit further comprises:
 a first current generating circuit, configured to generate the reference current;
 a second current generating circuit, comprising the at least one variable resistor, wherein the second current generating circuit generates the compensation current according to the at least one variable resistor.

21. The current driving circuit according to claim 18, wherein the light-emitting device comprises a vertical-cavity surface-emitting laser.

22. A current driving circuit, suitable for driving a light-emitting device, the current driving circuit comprising:
 a first current generating circuit, configured to generate a reference current;
 a second current generating circuit, comprising at least one variable resistor, wherein the second current generating circuit generates a compensation current according to the at least one variable resistor, the resistance of the at least one variable resistor is variable during the operation of the current driving circuit, and the at least one variable resistor is selected from at least one of a positive temperature variable resistor and a negative temperature variable resistor; and
 a driver circuit, coupled to the first current generating circuit and the second current generating circuit, and configured to receive the reference current and the compensation current as a driving current, wherein the driver circuit outputs the driving current to drive the light-emitting device, wherein the driving current changes with the operating temperature of the light-emitting device in a nonlinear manner throughout an entire temperature range,
 wherein the entire temperature range comprises a first temperature interval, a second temperature interval and a third temperature interval, and temperatures of the first temperature interval is larger than temperatures of the third temperature interval; and temperatures of the third temperature interval is larger than temperatures of the second temperature interval,
 wherein, in the first temperature interval, the driving current increases as temperature rises; in the second temperature interval, the driving current increases as temperature decreases, wherein the driving current in the first temperature interval and in the second temperature interval is higher than the driving current in the third temperature interval.

* * * * *